United States Patent
No

(10) Patent No.: US 9,849,867 B2
(45) Date of Patent: Dec. 26, 2017

(54) ELECTRONIC PARKING BRAKE EPB SYSTEM AND METHOD OF CONTROLLING THE SAME

(71) Applicant: MANDO CORPORATION, Gyeonggi-do (KR)

(72) Inventor: Su-Hwan No, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/163,658

(22) Filed: May 24, 2016

(65) Prior Publication Data

US 2016/0347299 A1 Dec. 1, 2016

(30) Foreign Application Priority Data

May 26, 2015 (KR) ........................ 10-2015-0072926

(51) Int. Cl.
 *B60T 17/22* (2006.01)
 *B60T 13/74* (2006.01)
 *B60T 1/00* (2006.01)

(52) U.S. Cl.
 CPC ............ *B60T 17/221* (2013.01); *B60T 1/005* (2013.01); *B60T 13/741* (2013.01); *B60T 13/746* (2013.01)

(58) Field of Classification Search
 CPC ...... B60T 17/221; B60T 1/005; B60T 13/741; B60T 13/746
 See application file for complete search history.

(56) References Cited

U.S. PATENT DOCUMENTS

| 6,225,769 B1* | 5/2001 | Brenner | H02H 7/0851 318/434 |
| 2001/0019470 A1* | 9/2001 | Hiwatari | H02H 7/0851 361/33 |
| 2011/0112741 A1* | 5/2011 | Choi | B60T 7/107 701/70 |

(Continued)

FOREIGN PATENT DOCUMENTS

| KR | 10-2010-0088686 | 8/2010 |
| KR | 10-2010-0097992 | 9/2010 |

(Continued)

OTHER PUBLICATIONS

Office Action dated Feb. 22, 2016 for Korean Patent Application No. 10-2015-0072926.

(Continued)

*Primary Examiner* — Aaron L Troost
(74) *Attorney, Agent, or Firm* — Ladas & Parry, LLP

(57) ABSTRACT

An electronic parking brake system and method for controlling an EPB system are disclosed. An EPB system including EPB actuator operated by a motor includes a motor driver which drives the motor of the EPB actuator; a current detector which detects a current flowing in the motor; and an electronic control unit (ECU) which drives the motor using the motor driver according to an operation mode, calculates an amount of current energy consumed by the motor using the current detected by the current detector while the motor is driving and a detecting time taken to detect the current, compares the calculated amount of current energy and a preset value, and controls an operation of the motor according to a result of the comparison.

16 Claims, 7 Drawing Sheets

(56) References Cited

U.S. PATENT DOCUMENTS

2014/0062352 A1* 3/2014 Wang .................. A01D 34/78
318/139

FOREIGN PATENT DOCUMENTS

| KR | 10-2013-0021788 | 3/2013 |
| KR | 10-2013-0053544 | 5/2013 |
| KR | 10-2013-0123741 | 11/2013 |
| WO | 2013/021424 | 2/2013 |

OTHER PUBLICATIONS

Notice of Allowance dated Jul. 29, 2016 for Korean Patent Application No. 10-2015-0072926 and its English summary provided by Applicant's foreign counsel.

* cited by examiner

ELECTRONIC PARKING BRAKE EPB SYSTEM AND METHOD OF CONTROLLING THE SAME

CROSS-REFERENCE TO RELATED APPLICATION

This application claims the priority to Korean Patent Application No. 10-2015-0072926, filed on May 26, 2015 in the Korean Intellectual Property Office, the disclosure of which is incorporated herein by reference in its entirety.

BACKGROUND

1. Field

Embodiments of the present disclosure relate to an electronic parking brake (EPB) system and a method of controlling the same, and more particularly, to an EPB system which controls an operation or release of an EPB and a method of controlling the same.

2. Description of the Related Art

Recently, an electronic parking brake (EPB) system which is installed on a conventional disk brake and electronically controls driving of a parking brake is being used for performing a function of the parking brake.

Such an EPB system includes an EPB actuator including a motor which generates braking power and an electronic control unit (ECU) for driving the EPB actuator.

The ECU drives the EPB actuator to apply or to release the parking brake.

A safety mechanism implemented as concept for protection of a conventional EPB actuator uses a current waveform that is capable of checking and reacting to an extreme situation in which an operation is not performed due to an insertion or a movement is not stopped due to being broken due to a destruction or an abnormal operation of the EPB actuator, such as a stuck motor or a motor overrun. The stuck motor refers to a motor that cannot rotate due to the motor's mechanical insertion. The motor overrun refers to current that does not vary because a motor is not loaded.

However, various demands for functional safety of the EPB system due to recent strengthening of safety requirements of electronic components greatly influence product competitiveness.

Accordingly, various safety mechanisms are being developed for protecting electronic components of the EPB actuator, and there is a need to protect hardware components of the EPB actuator by checking whether the EPB actuator is operating abnormally in advance and reacting to the abnormal operation before the EPB actuator is placed in the above-described extreme state.

PRIOR ART DOCUMENT

Korea Publication of Patent Application No. 2013-0021788

SUMMARY

Therefore, it is an aspect of the present disclosure to provide an electronic parking brake (EPB) system which checks for an abnormal operation of an EPB actuator in advance and a method of controlling the same.

Additional aspects of the disclosure will be set forth in part in the description which follows and, in part, will be obvious from the description, or may be learned by practice of the disclosure.

In accordance with one aspect of the present invention, an electronic parking brake (EPB) system which includes an EPB actuator operated by a motor includes: a motor driver which drives the motor of the EPB actuator; a current detector which detects a current flowing in the motor; and an electronic control unit (ECU) which drives the motor using the motor driver according to an operation mode, calculates an amount of current energy consumed by the motor using the current detected by the current detector while the motor is driving and a detecting time taken to detect the current, compares the calculated amount of current energy and a preset value, and controls an operation of the motor according to a result of the comparison.

The ECU may calculate a voltage difference between both terminals of the motor and calculate an amount of current energy consumed by the motor while the motor is being driven based on the calculated voltage difference and an internal resistance of the motor.

When the calculated amount of current energy is greater than the preset value, the ECU may determine that the motor is overloaded.

The EPB system may further comprise a warning portion which warns of the overloading of the motor, when the ECU determines that the motor is overloaded, the ECU may stop an operation of the motor using the motor driver and may warn of the overloading of the motor using the warning portion.

The operation mode may include one of a parking operation, a parking release, and a pad exchange, and each of the preset value may set differently according to the operation mode.

The EPB system may include a memory which stores the motor current flowing in the motor; and a counter which counts time while the motor is driving, wherein the ECU stores each of the current detected by the current detector while the motor is being driven and the detecting time taken to detect the current in the memory, calculates an amount of current energy consumed by the motor since start of a corresponding operation mode to a present point using the current and the detecting time stored in the memory, compares the calculated amount of current energy and a preset value, and determines whether the motor is overloaded.

When the ECU calculates the amount of current energy, the ECU may calculate at least one of a first amount of current energy which is a cumulated value of a product of the motor current (I) and the detecting time (t) stored in the memory while the motor is being driven or a second amount of current energy which is a cumulated value of a product of a square of the motor current (I) and the detecting time.

When at least one of the first amount of current energy and the second amount of current energy is greater than a value preset to correspond to a current operation mode, the ECU may determine that the motor is overloaded.

In accordance with another aspect of the present invention, a method of controlling an EPB system which includes an EPB actuator operated by a motor, the method comprises: driving the motor according to an operation mode; detecting a current flowing in the motor while the motor is being driven and a detecting time taken to detect the current; storing the detected current and the detecting time; calculating an amount of current energy consumed by the motor since start of a corresponding operation mode to a present point using the stored current and detecting time; and comparing the calculated amount of current energy and a preset value and determining whether the motor is overloaded.

The calculation of the amount of current energy may include calculating at least one of a first amount of current energy which is a cumulative value of a product of the motor current (I) and the detecting time (t) stored in a memory while the motor is being driven or a second amount of current energy which is a cumulative value of a product of a square of the motor current (I) and the detecting time.

The determining of whether the motor is overloaded may include determining the overloading of the motor when at least one of the first amount of current energy and the second amount of current energy is greater than a value preset corresponding to a current operation mode.

The operation mode may include one of a parking operation, a parking release, and a pad exchange, and the preset value is set differently according to the operation mode.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
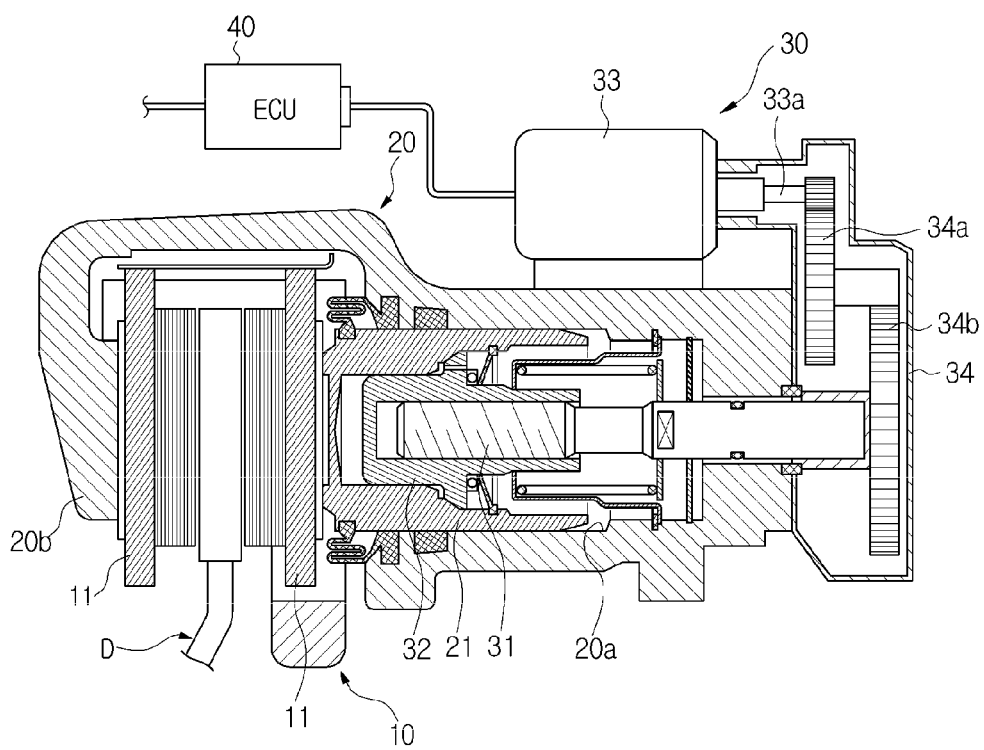
FIG. 1 is a schematic view illustrating a configuration of an EPB system according to one embodiment of the present disclosure.

Hereinafter, embodiments of the present disclosure will be described in detail with reference to the accompanying drawings. The following embodiments are examples which provide the scope of the present disclosure to those skilled in the art. The present disclosure is not limited to the following embodiments and may be implemented in different forms. Parts irrelevant to description are omitted in the drawings in order to clearly describe the present disclosure, and widths, lengths, and thicknesses of components in the drawings may be exaggerated for convenience of description. In this specification, the same reference numbers denote the same components.

Electronic parking brakes (EPB) system include a cable puller type, a motor-on-caliper type, and the like according to an operation method. Even when a driver does not manually operate a parking brake, the EPB system automatically operates to maintain a parking state or a stopping state of a vehicle when the vehicle is stopped or there is possibility for the vehicle to slide backward when departing from a hill.

Hereinafter, the motor-on-caliper type EPB system will be exemplified and described in the description for the sake of convenience.

FIG. 1 is a schematic view illustrating a configuration of an EPB system according to one embodiment of the present disclosure.

Referring to FIG. 1, the EPB system may include an EPB actuator 30 which operates disc brakes 10 and 20 provided at vehicle wheels to generate braking power, and an electronic control unit (ECU) 40 which controls an operation of the EPB actuator 30.

The disc brakes 10 and 20 include a carrier 10 which is coupled to a vehicle body and in which a pair of friction pads 11 which are spaced a predetermined distance from each other are installed, and a caliper housing 20 in which a cylinder 20a which is installed to be movable forward and backward toward the carrier 10 and in which a piston 21 is installed to be movable forward and backward such that the two friction pads 11 press a disc D, and a finger portion 20b is provided at the other side.

The EPB actuator 30 includes an operation shaft 31 rotatably installed in the cylinder 20a of the caliper housing 20, a pressing sleeve 32 installed inside the piston 21 to press the piston 21 or to release the pressure by moving forward and backward by a rotation of the operation shaft 31, a motor 33 for rotating the operation shaft 31 forward or in reverse, a reduction gear assembly 34 which includes a plurality of gears 34a and 34b to reduce the number of revolutions to transmit power generated from the rotating shaft 33a of the motor 33 to the operation shaft 31.

Figure 2:
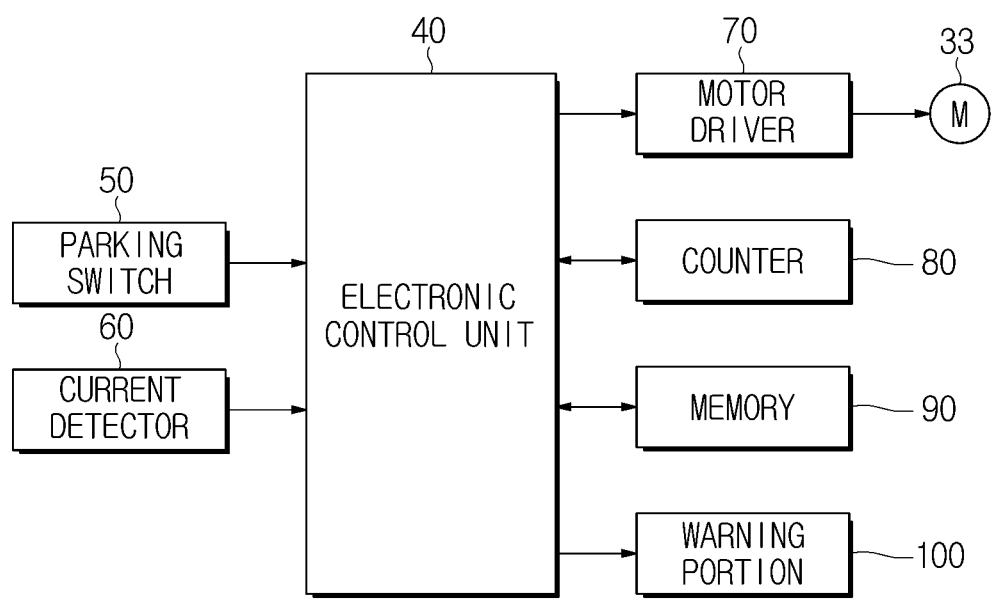
FIG. 2 is a control block diagram of the EPB system according to one embodiment of the present disclosure.
Figure 3:
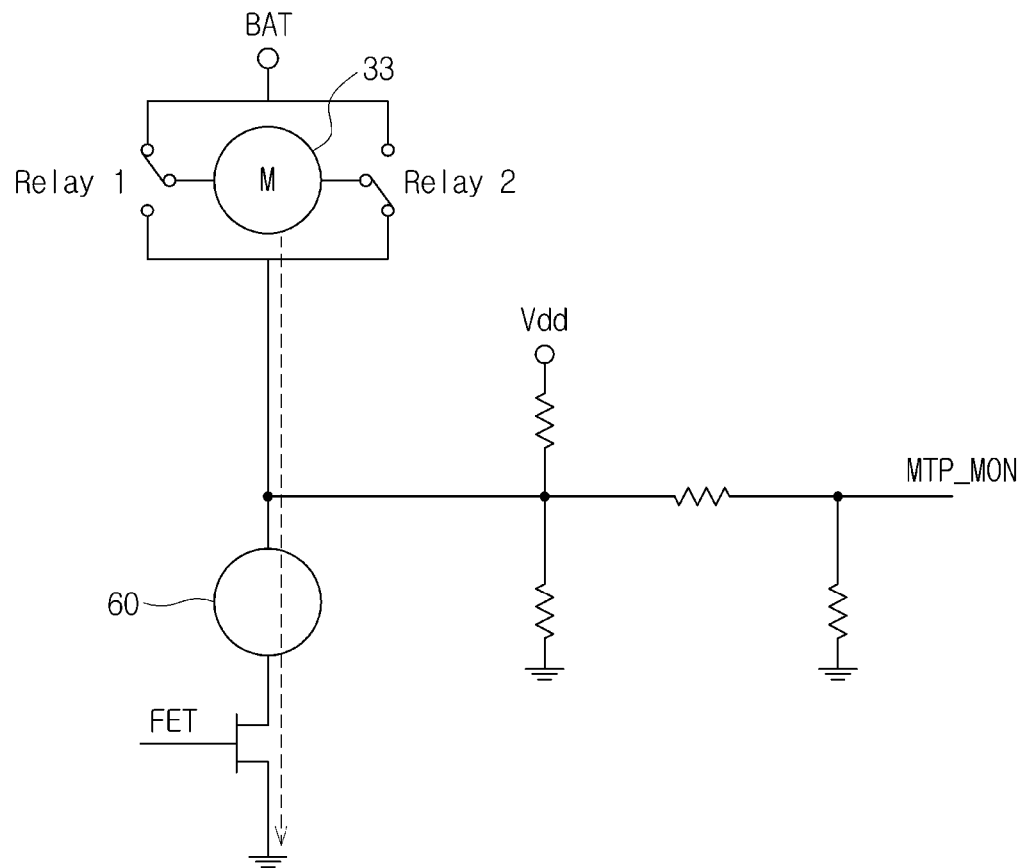
FIG. 3 is a view for describing a current detector of the EPB system according to one embodiment of the present disclosure.

FIG. 2 is a control block diagram of the EPB system according to one embodiment of the present disclosure, and FIG. 3 is a view for describing a current detector of the EPB system according to one embodiment of the present disclosure.

Referring to FIG. 2, the EPB system includes the ECU 40 which performs overall controlling related to an operation of an EPB.

At an input side of the ECU 40, a parking switch 50 and a current detector 60 are electrically connected.

At an output side of the ECU 40, a motor driver 70 and a warning portion 100 are electrically connected.

At the input and output of the ECU 40, a counter 80 and a memory 90 are electrically connected.

When the parking switch 50 is turned on by a user, the parking switch 50 sends a parking operation signal to the ECU 40 for an operation of the EPB system, and when the parking switch 50 is turned off by the user, the parking switch 50 sends a parking release signal to the ECU 40 for releasing the EPB system. That is, a state of the EPB system is changed to an operation or release state according to an operation state of the parking switch 50.

The current detector 60 detects a current flowing in the motor 33. For example, the current detector 60 may detect a motor current flowing in the motor using a shunt resistor or hall sensor (see FIG. 3). Various methods configured to detect the motor current in addition to the shunt resistor or hall sensor may be applied to the current detector 60.

The motor driver 70 rotates the motor 33 forward or in reverse. For example, the motor driver 70 may include a H-bridge circuit including a plurality of power switching elements configured to rotate the motor 33 forward or in reverse. As illustrated in FIG. 3, the motor driver 70 may rotate the motor 33 in one direction by simultaneously turning on a relay 1 and turning off a relay 2. On the contrary, the motor driver 70 may rotate the motor 33 in an opposite direction by simultaneously turning off the relay 1 and turning on the relay 2. During a parking operation in which the motor 33 is rotated in one direction by the motor driver 70, the one directional rotation of the motor 33 is reduced in rotation speed by the reduction gear assembly 34 and thus rotates the operation shaft 31 with large power in one direction. When the operation shaft 31 is rotated in one direction, the pressing sleeve 32 is moved in a direction of the shaft, and when the pressing sleeve 32 presses the piston 21, the two friction pads 11 press the disc D for braking wheels. A parking release is performed by a reverse operation of the parking operation. Although a pad exchange is performed by the same method as the parking release, an operation of the motor 33 is controlled to further move backward the operation shaft 31 so that the pad exchange is possible.

The counter 80 counts operation time of the motor 33 for each of the operation modes (the parking operation, the parking release, and the pad exchange).

The memory 90 stores a preset value for each of the operation modes (the parking operation, the parking release, and the pad exchange). The present values are each set differently according to the operation modes.

The warning portion 100 warns a driver about an abnormal operation of the EPB actuator 30. The warning portion 100 warns the driver about an overloading of the motor 33 provided in the EPB actuator 30. The warning portion 100 is implemented by including a visual element such as a warning lamp or an acoustic element such as a buzzer mounted on a right place inside a vehicle and warns of the overloading of the motor 33 by operating the warning lamp or buzzer according to a control signal of the ECU 40. A speaker may be used as the acoustic component for the warning portion 100, and such a speaker may be a speaker of an audio system included inside a vehicle or may also be a speaker additionally prepared at a suitable place inside the vehicle.

During a parking operation mode, the ECU 40 performs a parking operation which provides braking power to the disc brakes 10 and 20 by rotating the motor 33 of the EPB actuator 30 in one direction using the motor driver 70.

During a parking release mode, the ECU 40 performs a parking release which releases the braking power provided to the disc brakes 10 and 20 by rotating the motor 33 of the EPB actuator 30 in reverse using the motor driver 70.

In the pad exchange mode, the ECU 40 rotates the motor 33 of the EPB actuator 30 using the motor driver 70 in a direction opposite that of the parking operation to exchange the friction pad 11.

The ECU 40 drives the motor 33 using the motor driver 70 according to the operation mode, detects a current flowing in the motor 33 using the current detector 60, calculates an amount of current energy consumed by the motor 33 while the motor 33 is being driven using the detected current, compares the calculated amount of current energy and a preset value, and controls an operation of the motor 33 according to the comparison result.

In addition, to calculate an amount of current energy consumed by the motor 33 while the motor 33 is being driven, the ECU 40 may also calculate a voltage difference between the both terminals of the motor, and calculate an amount of current energy based on the calculated voltage difference and internal resistance (not shown) of the motor.

At this point, the voltage difference between the both terminals of the motor may be obtained by calculating a voltage between the both terminals of the motor by considering a voltage drop consumed for supplying a voltage to the motor from a battery BAT.

During the parking operation mode, the ECU 40 drives the motor 33, detects a current of the motor for each operation time of the motor 33, calculates an amount of current energy consumed by the motor 33 while the motor 33 is being driven using the calculated current of the motor for each operation time of the motor 33, compares the calculated amount of current energy and a preset value corresponding to the parking operation mode among preset values for the operation modes stored in the memory 90, and, from the comparison result, determines that the motor 33 is overloaded and stops the motor 33 in an emergency when the calculated amount of current energy is greater than the preset value corresponding to the parking operation mode. At this point, the ECU 40 warns a driver about an overloading of the motor 33 using the warning portion 100. When the driver is warned of the overloading of the motor 33, the ECU 40 may warn of the overloading of the motor 33 during an operation of the parking operation mode.

Figure 4:
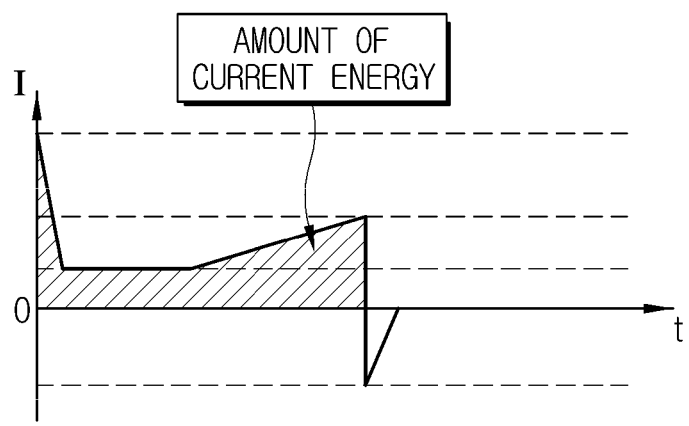
FIG. 4 is a graph for describing an amount of current energy during a parking operation mode in the EPB system according to one embodiment of the present disclosure.

FIG. 4 is a graph for describing an amount of current energy during a parking operation mode in the EPB system according to one embodiment of the present disclosure.

A waveform of a current flowing in the motor 33 during a parking operation appears as a current waveform shown in FIG. 4. An amount of current energy which is decided according to a current and time may be basically a shaded area or a value corresponding thereto.

An amount of current energy may include at least one of a first amount of current energy which is a cumulative value of a product of a current I and time t or a second amount of current energy which is a cumulative value of a product of a square of a current I and time while the motor 33 is operating.

The first amount of current energy and the second amount of current energy are obtained using values calculated in real time according to motor operation time. When the EPB actuator 30 operates abnormally for a long time, a cumulative value of a product of a current and time and a cumulative value of a product of a square a current and time become large. By restricting the cumulative value, safety of the EPB actuator 30 during time of an abnormal operating may be improved.

When at least one of the first amount of current energy and the second amount of current energy which are calculated amounts of current energy while the parking operation is performed is greater than each preset value (a first value corresponding to the first amount of current energy and a second value corresponding to the second amount of current energy) stored in the memory 90 to correspond to the parking operation mode, the ECU 40 may determine that the motor 33 is overloaded and stop the motor 33 in an emergency.

Figure 5:
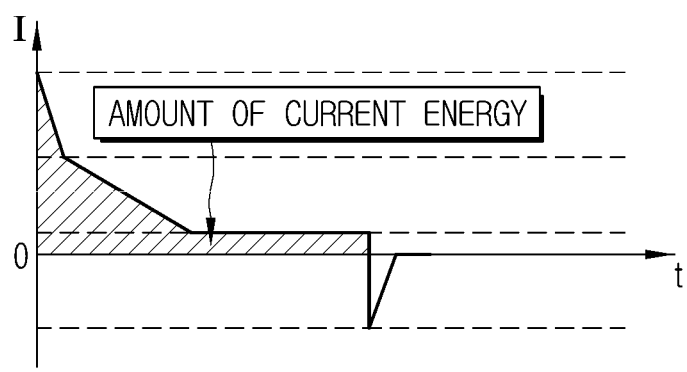
FIG. 5 is a graph for describing an amount of current energy during a parking release mode in the EPB system according to one embodiment of the present disclosure.

FIG. 5 is a graph for describing an amount of current energy during a parking release mode in the EPB system according to one embodiment of the present disclosure.

A waveform of a current flowing in the motor 33 during a parking release appears as a current waveform shown in FIG. 5. As in the parking operation mode, an amount of current energy which is decided according to a current and time may be basically the shaded area or a value corresponding thereto.

An amount of current energy may include at least one of a first amount of current energy which is a cumulative value of a product of a current I and time t or a second amount of current energy which is a cumulative value of a product of a square of a current I and time while the motor 33 is operating.

When at least one of a first amount of current energy and a second amount of current energy which are calculated amounts of current energy while a parking release is performed is greater than a preset value stored in the memory 90 to correspond to the parking release mode, the ECU 40 may determine that the motor 33 is overloaded and may stop the motor 33 in an emergency.

Figure 6:
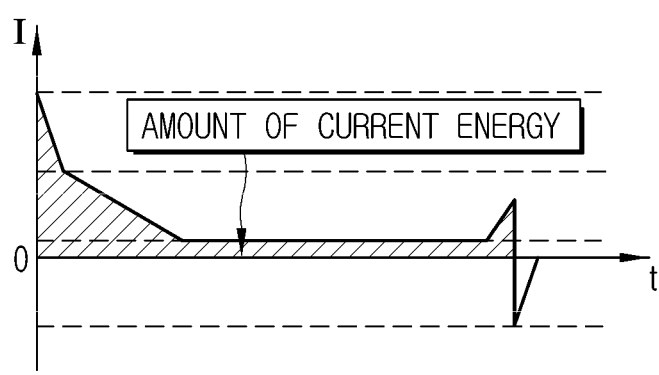
FIG. 6 is a graph for describing an amount of current energy during a pad exchange mode in the EPB system according to one embodiment of the present disclosure.

FIG. 6 is a graph for describing an amount of current energy during a pad exchange mode in the EPB system according to one embodiment of the present disclosure.

A waveform of a current flowing in the motor 33 during a pad exchange appears as a current waveform shown in FIG. 6. As in the parking operation mode, an amount of current energy which is decided according to a current and time may be basically the shaded area or a value corresponding thereto.

An amount of current energy may include at least one of a first amount of current energy which is a cumulative value of a product of a current I and time t or a second amount of current energy which is a cumulative value of a product of a square of a current I and time while the motor 33 is operating.

When at least one of a first amount of current energy and a second amount of current energy which are calculated amounts of current energy while a pad exchange is performed is greater than a preset value stored in the memory 90 to correspond to the pad exchange mode, the ECU 40 may determine that the motor 33 is overloaded and may stop the motor 33 in an emergency.

Figure 7:
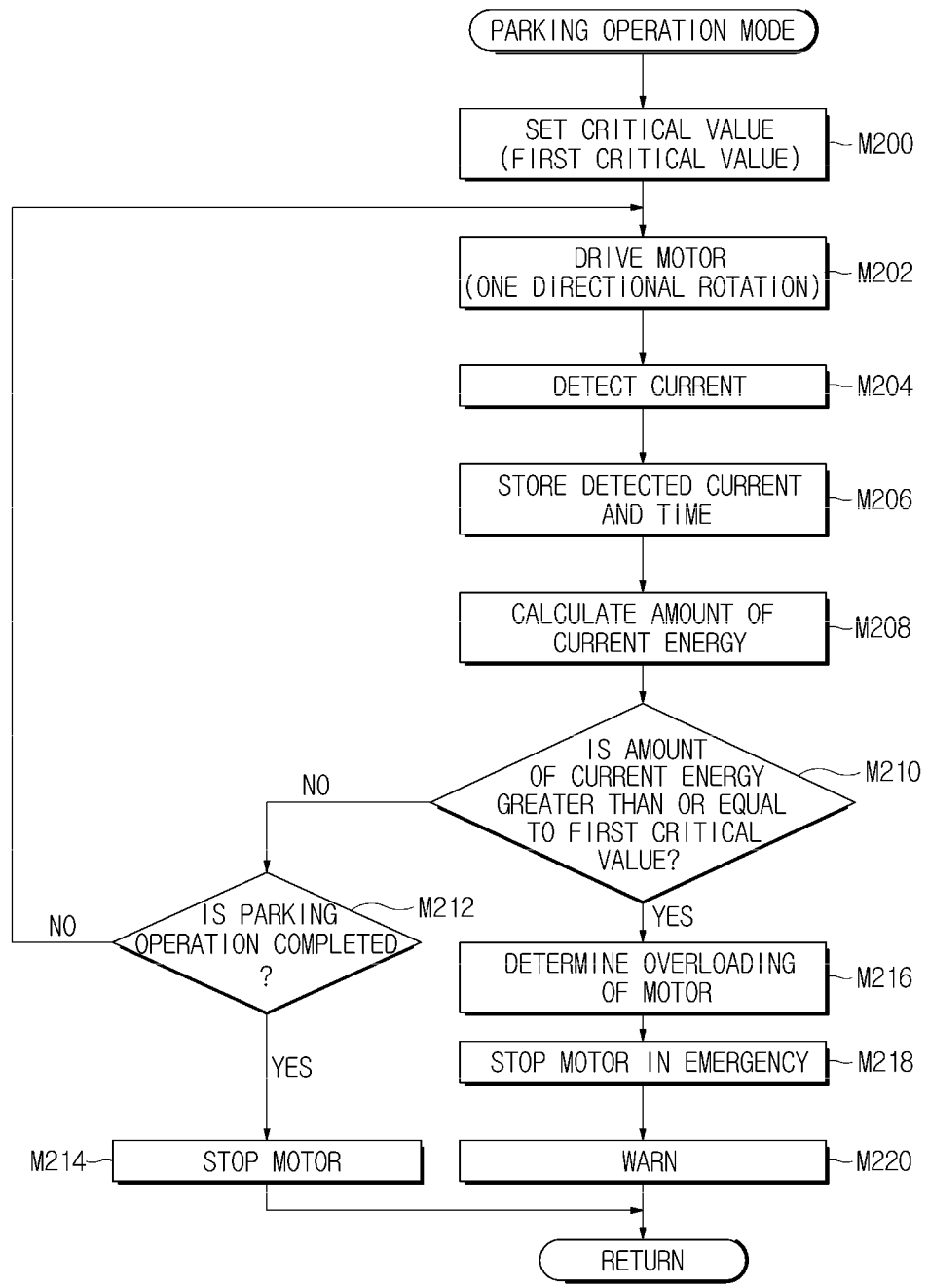
FIG. 7 is a control flow chart for describing an operation in the parking operation mode in the EPB system according to one embodiment of the present disclosure.

FIG. 7 is a control flow chart for describing an operation in the parking operation mode in the EPB system according to one embodiment of the present disclosure.

Referring to FIG. 7, the ECU 40 sets a critical value corresponding to parking operation mode during the parking operation mode (M200). Hereinafter, it is assumed that the critical value corresponding to the parking operation mode is a first critical value.

The ECU 40 rotates the motor 33 in one direction to perform a parking operation (M202).

The ECU 40 detects a current flowing in the motor while the motor is operating (M204) and stores the detected current and a detecting time taken to detect the current in the memory 90 in real time (M206).

The ECU 40 calculates an amount of current energy in real time using the motor current and the detecting time stored in the memory 90 while the motor is operating (M208).

The ECU 40 determines whether the calculated amount of current energy is greater than the first critical value by comparing the calculated amount of current energy and the first critical value (M210).

In a result of the operation mode M210, when the calculated amount of current energy is less than the first critical value, whether a parking operation is completed (M212) is determined. The completion of the parking operation may be determined by determining whether a motor current reaches a target current as usual.

In a result of the operation mode M212, when the parking operation has been completed, the ECU 40 stops the motor 33 (M214).

Meanwhile, in a result of the operation mode M212, when the parking operation has not been completed, the ECU 40 returns to the operation mode M202 and performs following operation modes.

Meanwhile, in a result of the operation mode M210, when the calculated amount of current energy is the first critical value or more, the ECU 40 determines that the EPB actuator operated abnormally or the motor has been overloaded due to the abnormal operation (M216). Accordingly, the ECU 40 stops the motor 33 in an emergency (M218). At this point, the ECU 40 warns a driver about the abnormal operation of the EPB actuator or the overloading of the motor (M220).

Accordingly, whether the EPB actuator 30 operates abnormally during the parking operation may be checked in advance by using an amount of current energy consumed by the motor 33 of the EPB actuator 30. Accordingly, since the EPB actuator 30 can be stopped in an emergency before an extreme situation occurs during the parking operation, hardware components of a system can be protected.

Figure 8:
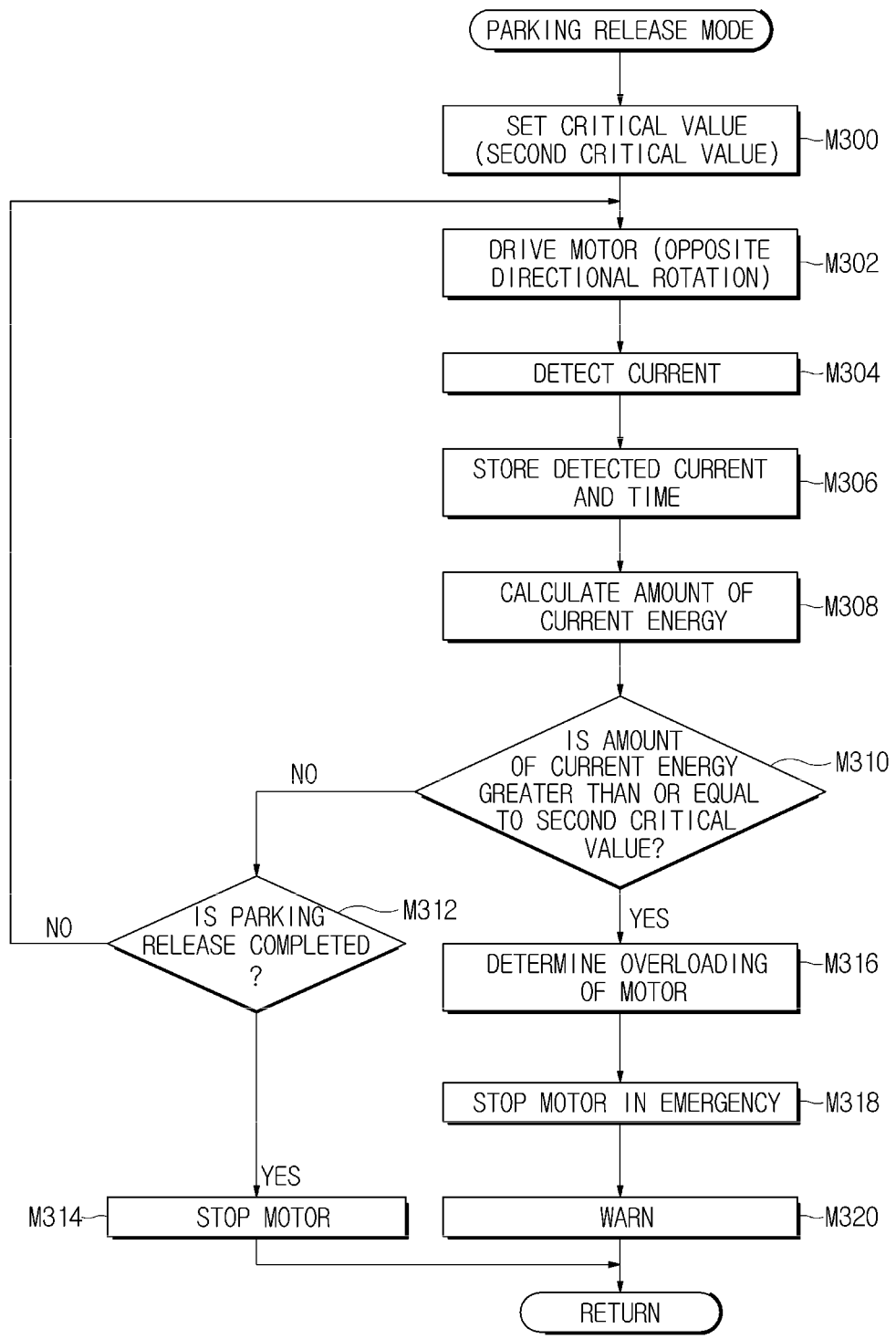
FIG. 8 is a control flow chart for describing an operation in the parking release mode in the EPB system according to one embodiment of the present disclosure.

FIG. 8 is a control flow chart for describing an operation in the parking release mode in the EPB system according to one embodiment of the present disclosure.

Referring to FIG. 8, in the parking release mode, the ECU 40 sets a critical value corresponding to the parking release mode (M300). Hereinafter, it is assumed that the critical value corresponding to the parking release mode is a second critical value.

The ECU 40 rotates the motor 33 in a direction opposite that of the parking operation mode to perform a parking release (M302).

The ECU 40 detects a current flowing in the motor while the motor is operating (M304) and stores the detected current and a detecting time taken to detect the current in the memory 90 in real time (M306).

The ECU 40 calculates an amount of current energy using the motor current and the detecting time stored in the memory 90 in real time while the motor is operating (M308).

The ECU 40 determines whether the calculated amount of current energy is greater than the second critical value by comparing the calculated amount of current energy and the second critical value (M310).

In a result of the operation mode M310, when the calculated amount of current energy is less than the second critical value, whether a parking release is completed (M312) is determined. The completion of the parking release may be determined by determining whether a motor current reaches a target current during the parking release as usual.

In a result of the operation mode M312, when the parking release has been completed, the ECU 40 stops the motor 33 (M314).

Meanwhile, in a result of the operation mode M312, when the parking release has not been completed, the ECU 40 returns to the operation mode M302 and performs following operation modes.

Meanwhile, in a result of the operation mode M310, when the calculated amount of current energy is the second critical value or more, the ECU 40 determines that the EPB actuator operated abnormally or the motor has been overloaded due to the abnormal operation (M316). Accordingly, the ECU 40 stops the motor 33 in an emergency (M318). At this point, the ECU 40 warns a driver about the abnormal operation of the EPB actuator or the overloading of the motor (M320).

Accordingly, whether the EPB actuator 30 operates abnormally during the parking release may be checked in advance by using an amount of current energy consumed by the motor 33 of the EPB actuator 30. Accordingly, since the EPB actuator 30 can be stopped in an emergency before an extreme situation occurs during the parking release, hardware components of a system can be protected.

Figure 9:
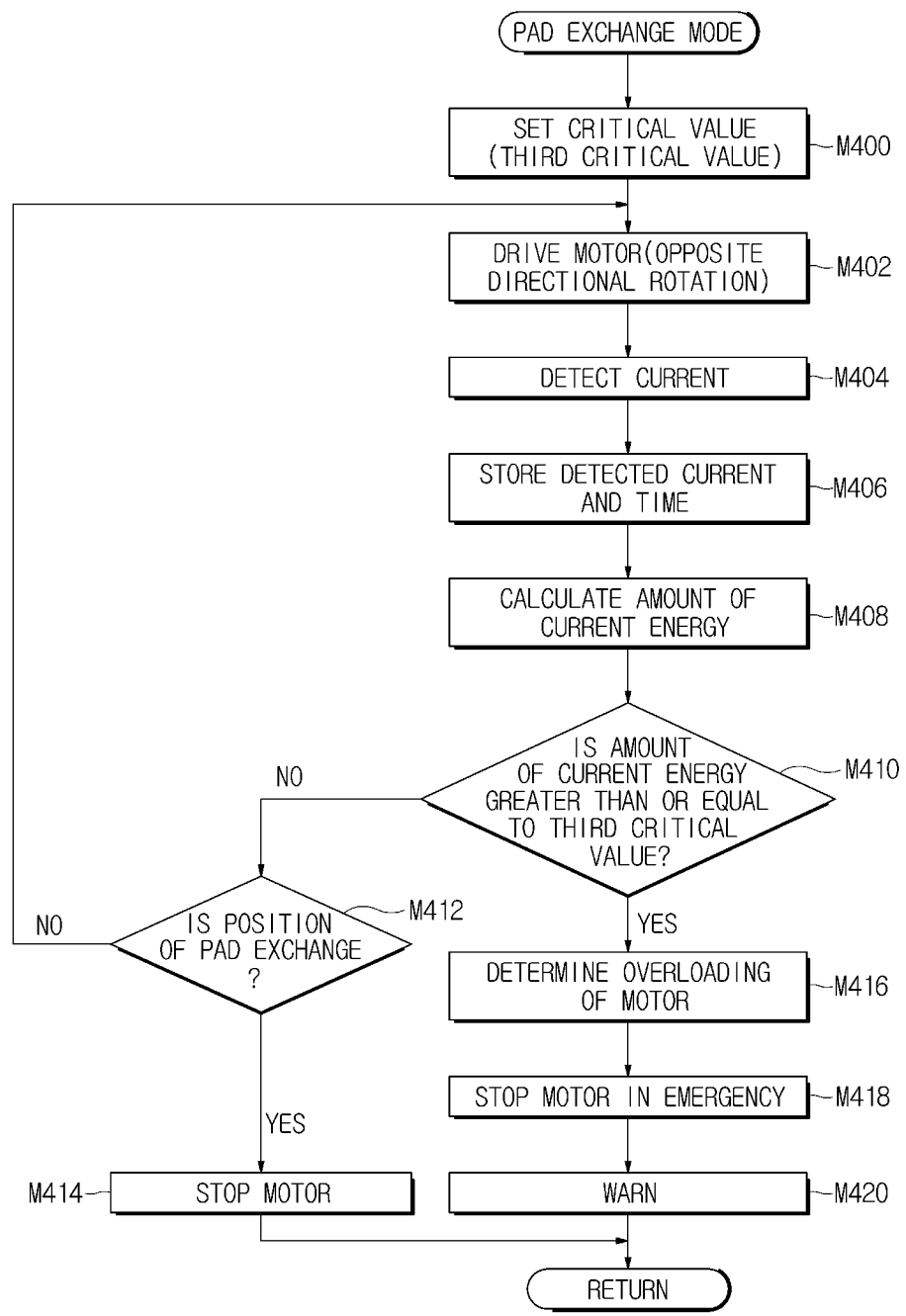
FIG. 9 is a control flow chart for describing an operation in the pad exchange mode in the EPB system according to one embodiment of the present disclosure.

FIG. 9 is a control flow chart for describing an operation in the pad exchange mode in the EPB system according to one embodiment of the present disclosure.

Referring to FIG. 9, in the pad exchange mode, the ECU 40 sets a critical value corresponding to the parking release mode (M400). Hereinafter, it is assumed that the critical value corresponding to the d mode is a third critical value.

The ECU 40 rotates the motor 33 in a direction opposite that of the parking operation mode to perform a parking release (M402).

The ECU 40 detects a current flowing in the motor while the motor is operating (M404) and stores the detected current and a detecting time taken to detect the current in the memory 90 in real time (M406).

The ECU 40 calculates an amount of current energy using the motor current and the detecting time stored in the memory 90 in real time while the motor is operating (M408).

The ECU 40 determines whether the calculated amount of current energy is greater than the third critical value by comparing the calculated amount of current energy and the second critical value (M410).

In a result of the operation mode M410, when the calculated amount of current energy is less than the third critical value, whether pads are positioned at a pad exchange position (M412) is determined. Whether the pad exchange position has been reached may be determined by determining whether a motor current reaches a target current during the pad exchange as usual.

In a result of the operation mode M412, when the pads are positioned at the pad exchange position, the ECU 40 stops the motor 33 (M414).

Meanwhile, in a result of the operation mode M412, when the pads are not positioned at the pad exchange position, the ECU 40 returns to the operation mode M402 and performs following operation modes.

Meanwhile, in a result of the operation mode M310, when the calculated amount of current energy is the second critical value or more, the ECU 40 determines that the EPB actuator operated abnormally or the motor has been overloaded due to the abnormal operation (M416). Accordingly, the ECU 40 stops the motor 33 in an emergency (M418). At this point, the ECU 40 warns a driver about the abnormal operation of the EPB actuator or the overloading of the motor (M420).

Accordingly, whether the EPB actuator 30 operates abnormally during the parking release may be checked in advance by using an amount of current energy consumed by the motor 33 of the EPB actuator 30. Accordingly, since the EPB actuator 30 can be stopped in an emergency before an extreme situation occurs during the parking release, hardware components of a system can be protected.

As is apparent from the above description, hardware components of a system can be protected because an EPB actuator can be stopped before an extreme situation occurs by checking in advance whether the EPB actuator operates abnormally using an amount of current energy consumed by a motor of the EPB actuator.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electronic parking brake (EPB) system including an EPB actuator operated by a motor, the EPB system comprising:
    a motor driver which drives the motor of the EPB actuator;
    a current detector which detects a current flowing in the motor; and
    an electronic control unit (ECU) which drives the motor using the motor driver according to an operation mode, calculates an amount of current energy consumed by the motor using the current detected by the current detector while the motor is driving and a detecting time taken to detect the current, compares the calculated amount of current energy and a preset value, and controls an operation of the motor according to a result of the comparison,
    wherein the operation mode includes a parking operation mode, a parking release mode and a pad exchange mode, and the preset value is set differently depending on the operation mode.

2. The EPB system of claim 1, wherein the ECU calculates a voltage difference between both terminals of the motor and calculates an amount of current energy consumed by the motor while the motor is being driven based on the calculated voltage difference and an internal resistance of the motor.

3. The EPB system of claim 2, wherein when the calculated amount of current energy is greater than the preset value, the ECU determines that the motor is overloaded.

4. The EPB system of claim 3, further comprising a warning portion which warns of the overloading of the motor,
    wherein when the ECU determines that the motor is overloaded, the ECU stops an operation of the motor using the motor driver and warns of the overloading of the motor using the warning portion.

5. The EPB system of claim 1, wherein when the calculated amount of current energy is greater than the preset value, the ECU determines that the motor is overloaded.

6. The EPB system of claim 5, further comprising a warning portion which warns of the overloading of the motor,
    wherein when the ECU determines that the motor is overloaded, the ECU stops an operation of the motor using the motor driver and warns of the overloading of the motor using the warning portion.

7. The EPB system of claim 1, further comprising:
    a memory which stores the motor current flowing in the motor; and
    a counter which counts time while the motor is driving,
    wherein the ECU stores each of the current detected by the current detector while the motor is being driven and the detecting time taken to detect the current in the memory, calculates an amount of current energy consumed by the motor since start of a corresponding operation mode to a present point using the current and the detecting time stored in the memory, compares the calculated amount of current energy and a preset value, and determines whether the motor is overloaded.

8. The EPB system of claim 1, wherein when the ECU calculates the amount of current energy, the ECU calculates at least one of a first amount of current energy which is a cumulated value of a product of the motor current (I) and the detecting time (t) stored in the memory while the motor is being driven or a second amount of current energy which is a cumulated value of a product of a square of the motor current (I) and the detecting time.

9. The EPB system of claim 8, wherein when at least one of the first amount of current energy and the second amount of current energy is greater than a value preset to correspond to a current operation mode, the ECU determines that the motor is overloaded.

10. The EPB system of claim 1, wherein the parking operation mode is configured to provide braking power to disc brakes and the parking release mode is configured to release the braking power provided to the disc brakes.

11. The EPB system of claim 1, wherein the pad exchange mode is configured to rotate the motor of the EPB actuator in a direction opposite to a direction of a parking operation.

12. A method of controlling an EPB system including an EPB actuator operated by a motor, the method comprising:
  driving the motor according to an operation mode;
  detecting a current flowing in the motor while the motor is being driven and a detecting time taken to detect the current;
  storing the detected current and the detecting time;
  calculating an amount of current energy consumed by the motor since start of a corresponding operation mode to a present point using the stored current and detecting time; and
  comparing the calculated amount of current energy and a preset value and determining whether the motor is overloaded,
  wherein the operation mode includes a parking operation mode, a parking release mode and a pad exchange mode, and the preset value is set differently depending on the operation mode.

13. The method of claim 12, wherein the calculation of the amount of current energy includes calculating at least one of a first amount of current energy which is a cumulative value of a product of the motor current (I) and the detecting time (t) stored in a memory while the motor is being driven or a second amount of current energy which is a cumulative value of a product of a square of the motor current (I) and the detecting time.

14. The method of claim 13, wherein the determining of whether the motor is overloaded includes determining the overloading of the motor when at least one of the first amount of current energy and the second amount of current energy is greater than a value preset corresponding to a current operation mode.

15. The method of claim 12, wherein the parking operation mode is configured to provide braking power to disc brakes and the parking release mode is configured to release the braking power provided to the disc brakes.

16. The method of claim 12, wherein the pad exchange mode is configured to rotate the motor of the EPB actuator in a direction opposite to a direction of a parking operation.

* * * * *